J.S. Tibbets. Safety Shaft for Vehicles.

116889

PATENTED JUL 11 1871

Witnesses:
A.W. Almqvist
Wm H. C. Smith

Inventor:
J. S. Tibbets.

Per Mmmfly
Attorneys.

116,889

UNITED STATES PATENT OFFICE.

JONATHAN S. TIBBETS, OF BRAZIL, INDIANA.

IMPROVEMENT IN SAFETY-SHAFTS FOR VEHICLES.

Specification forming part of Letters Patent No. 116,889, dated July 11, 1871.

*To all whom it may concern:*

Be it known that I, JONATHAN S. TIBBETS, of Brazil, in the county of Clay and State of Indiana, have invented a new and useful Improvement in Safety-Shafts for Vehicles; and I do hereby declare the following is a full, clear, and exact description thereof, which will enable others skilled in the art to make and use the same, reference being had to the accompanying drawing forming part of this specification, in which—

Figure 1:
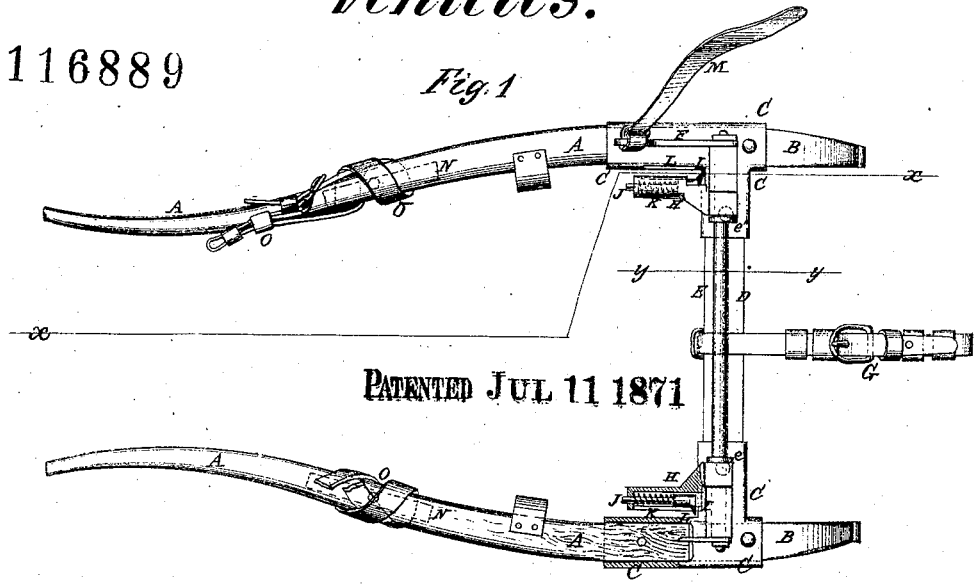
Figure 2:
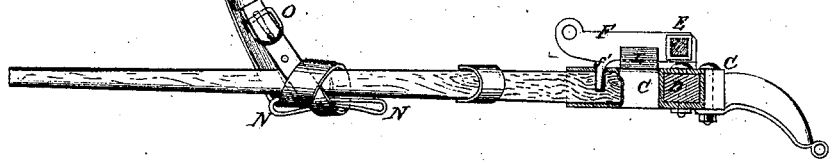
Figure 3:
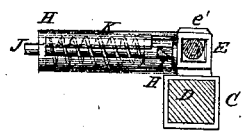

Figure 1 is a top view of my improved shafts, parts being broken away to show the construction. Fig. 2 is a detail sectional view of the same taken through the line *x x*, Fig. 1. Fig. 3 is a detail sectional view of the same taken through the line *y y*, Fig. 1.

Similar letters of reference indicate corresponding parts.

My invention has for its object to improve the construction of shafts for buggies and other vehicles, so that should the horse become frightened or otherwise unmanageable the driver may readily detach him from the vehicle, and, at the same time, in such a way that he will not be liable to injure himself with the parts of the shaft that he carries with him; and it consists in the construction and combination of various parts of the shafts, as hereinafter more fully described.

Each shaft is made in two parts, A B, which are connected to each other by a metallic connection, C, which may be made solid and in the form of a socket to receive the adjacent ends of the parts of the shafts, or which may be made in two parts placed above and beneath the shaft. The forward end of the rear part B of the shaft is securely bolted to the connection C, to which connection are also secured the ends of the cross-bar D. The rear ends of the forward parts A of the shafts are secured to the connections C, detachably, in the manner hereinafter described. E is the draft-bar, which works in eyes *e* attached to the connections C. To the ends of the draft-bar E are attached arms or levers F, which have pins *f'* formed upon the under side of their forward parts which pass through holes in the forward parts of the connections C and enter holes in the rear part of the forward parts or pieces A of the shafts. By this arrangement, when the levers F are in a horizontal position the parts of the shafts will be securely connected; but when the levers F are raised the forward parts A of the shafts will slip out of the connections C, leaving the cross-bars D, connections C, and rear parts B of the shafts still connected with the vehicle. The parts B C D are supported and prevented from dropping to ground when the forward parts A of the shafts are detached by the strap G, which passes around the cross-bar D and is connected with the body of the vehicle. H are hollow cylinders or tubes, to the rear ends of which are attached or upon them are formed lugs, which are rigidly connected with the draft-bar E. The sides of the tubes H toward the shafts are slotted longitudinally to receive the points or nibs I formed upon the rear ends of the guide-stems J, the forward ends of which project through holes in the center of the closed forward ends of the tubes or cylinders H. K are springs coiled around the stems J, the forward ends of which rest against the end of the tube H, and against the rear ends of which rest the heads formed upon the rear ends of the stems J. By this construction the springs K always hold the tugs tight and also lessen the jar when the horse starts. The nibs I are designed to receive the eyes of the tugs and are made inclined upon their forward side, as shown in Fig. 1, so that the eyes of the tugs may easily slip from them when the forward ends of the tubes H are raised. The eyes of the tugs are kept from slipping from the nibs I, when the tubes H are in a horizontal position, by the guard-plates L, attached to or formed upon the inner edge of the upper side of the forward part of the connections C, and between which and the tubes H the tugs pass. The upper sides of the rear ends of the tubes H have notches formed in them leading up from the slots in said tubes, to enable the nibs I to be turned upward to receive the eyes of the tugs, so that the said tugs can be placed upon them without raising the tubes H, and thus detaching the forward parts of the shafts. To the forward end of one of the levers F is attached a strap, M, which extends back to the vehicle and is secured in such a position that it can be conveniently reached and operated to detach the horse by those riding in the vehicle. To the under side of the forward part of the part A of the shaft is attached a double-looped strap, N, through the rear loop of which is passed the holdback-strap, and through the forward loop of which is passed the strap O, which secures the shafts in the shaft-tug or loop. The strap O is passed twice around the shaft, which, in connection with the loop N, prevents the forward parts A of the shafts, from being drawn out of the shaft, tug, or loop, so that the horse, when detached from the vehicle, will carry the forward parts A of the shafts with him, which parts will be so suspended by the holdback-straps O and shaft, tugs, or loops that they will not be liable to injure the horse.

Having thus described my invention, I claim as new and desire to secure by Letters Patent—

1. The shafts A B, made in two parts or pieces, detachably connected with each other, substantially as herein shown and described, and for the purpose set forth.

2. The connection C, whether made in one or two pieces, in combination with the parts A B of the shaft, substantially as herein shown and described, and for the purpose set forth.

3. The eyes $e'$, draft-bar E, and levers F, provided with points or pins $f'$ upon their forward ends, in combination with the parts A B of the shafts, and with connections C and cross-bar D, substantially as herein shown and described, and for the purpose set forth.

4. The slotted and notched tubular arms H, guide-stems J, and nibs or catches I, springs K, and guard-plates L, in combination with the draft-rod E, levers F, connections C, and parts A B of the shafts, substantially as herein shown and described, and for the purposes set forth.

5. The combination of the strap G with the cross-bar D and stationary parts B of the shafts, when said shafts are made in two parts, A B, substantially as herein shown and described, and for the purpose set forth.

6. The double-looped strap N, attached to the under side of the middle part of the detachable parts A of the shafts, to receive the holdback-strap and the strap O, substantially as herein shown and described.

7. The straps O, in combination with the double-looped strap N and detachable part A of the shafts, to secure the said parts A to the shaft, tug, or loop, substantially as herein shown and described, and for the purpose set forth.

JONATHAN S. TIBBETS.

Witnesses:
    J. C. GIFFORD,
    GEORGE W. ORR.